(12) United States Patent
Meshchaninov et al.

(10) Patent No.: US 11,986,791 B1
(45) Date of Patent: May 21, 2024

(54) REACTOR FOR WASTE TREATMENT

(71) Applicants: Mikhail Aleksandrovich Meshchaninov, Zhukovskiy (RU); Dmitrii Yanovich Agasarov, Krasnodar (RU); Anton Viktorovich Sergeev, Krasnodar (RU)

(72) Inventors: Mikhail Aleksandrovich Meshchaninov, Zhukovskiy (RU); Dmitrii Yanovich Agasarov, Krasnodar (RU)

(73) Assignees: Mikhail Aleksandrovich Meshchaninov, Zhukovskiy (RU); Dmitrii Yanovich Agasarov, Krasnodar (RU); Anton Viktorovich Sergeev, Krasnodar (RU)

( * ) Notice: Subject to any disclaimer, the term of this patent is extended or adjusted under 35 U.S.C. 154(b) by 0 days.

(21) Appl. No.: 18/376,662

(22) Filed: Oct. 4, 2023

Related U.S. Application Data

(63) Continuation of application No. PCT/RU2023/000239, filed on Aug. 3, 2023.

(30) Foreign Application Priority Data

Jul. 20, 2023 (RU) .................................. 2023119247

(51) Int. Cl.
*B01J 19/08* (2006.01)
*B01J 19/00* (2006.01)
*B09B 3/50* (2022.01)

(52) U.S. Cl.
CPC ......... *B01J 19/081* (2013.01); *B01J 19/0053* (2013.01); *B09B 3/50* (2022.01)

(58) Field of Classification Search
CPC ........ B01J 19/081; B01J 19/0053; B09B 3/50
See application file for complete search history.

(56) References Cited

U.S. PATENT DOCUMENTS

| | | | |
|---|---|---|---|
| 3,173,368 A * | 3/1965 | Griffith | F42D 1/18 |
| | | | 102/333 |
| 9,428,479 B2 * | 8/2016 | Medoff | C07D 307/12 |
| 2022/0088651 A1 * | 3/2022 | Nakaishi | C05F 11/08 |

FOREIGN PATENT DOCUMENTS

| CN | 203057022 U | 7/2013 |
|---|---|---|
| CN | 103368447 A | 10/2013 |

(Continued)

OTHER PUBLICATIONS

Piskarev (Redox Processes in Water, Initiated by Electric Discharge over Its Surface, 2001, Russian Journal of General Chemistry, vol. 71, No. 10, 2001, pp. 1536 31537) (Year: 2001).*

(Continued)

*Primary Examiner* — Youngsul Jeong
(74) *Attorney, Agent, or Firm* — Bardmesser Law Group

(57) ABSTRACT

The invention relates to devices for disposal of solid and/or liquid waste, in particular, to devices for disposing waste by ionic-electronic destruction method. The invention is directed to broadening a range of reactors for treatment of waste, the reactors having an enlarged area of formation of corona discharge streamers, thus avoiding a need to use a source of high-voltage pulses. The technical effect is attained by a reactor implemented as a closed cavity with an input opening connected to a waste feed unit, and with an output opening for removing gaseous destruction products, where an additional input opening is provided in the closed cavity for supplying electrically charged substance particles into the reactor.

13 Claims, 1 Drawing Sheet

(56) References Cited

FOREIGN PATENT DOCUMENTS

| | | |
|---|---|---|
| CN | 110995050 A | 4/2020 |
| ES | 2909949 A1 | 5/2022 |
| RU | 2 049 050 C1 | 11/1995 |
| RU | 2 105 040 C1 | 2/1998 |
| RU | 2 294 354 C2 | 2/2007 |
| RU | 2326487 C2 | 6/2008 |
| RU | 2 515 307 C1 | 5/2014 |
| RU | 2 528 848 C1 | 9/2014 |
| RU | 2 572 998 C2 | 12/2014 |
| RU | 2 619 122 C1 | 5/2017 |
| RU | 2 741 004 C1 | 1/2021 |
| RU | 2 764 684 C1 | 1/2022 |
| RU | 211 306 U1 | 5/2022 |
| RU | 2 775 021 C1 | 6/2022 |
| RU | 211 473 U1 | 6/2022 |
| RU | 2 786 209 C1 | 12/2022 |
| RU | 2021 130 871 A | 4/2023 |
| RU | 2021 130 949 A | 4/2023 |
| RU | 2 802 933 C1 | 5/2023 |
| RU | 2 797 526 C1 | 6/2023 |
| SU | 1744101 A1 | 6/1992 |

OTHER PUBLICATIONS

Piskarev I.M., Oxidation-reduction processes in water initiated by electrical discharge above water surface // General Chemistry Journal, 2001, vol. 71, Issue 10, p. 1622.

Sinkevich A.A., Dovgalyuk Yu. A., Corona discharge in clouds, News of Higher Schools, Radiophysics, 2013, vol. 56, Issue 11-12, pp. 908-919.

\* cited by examiner

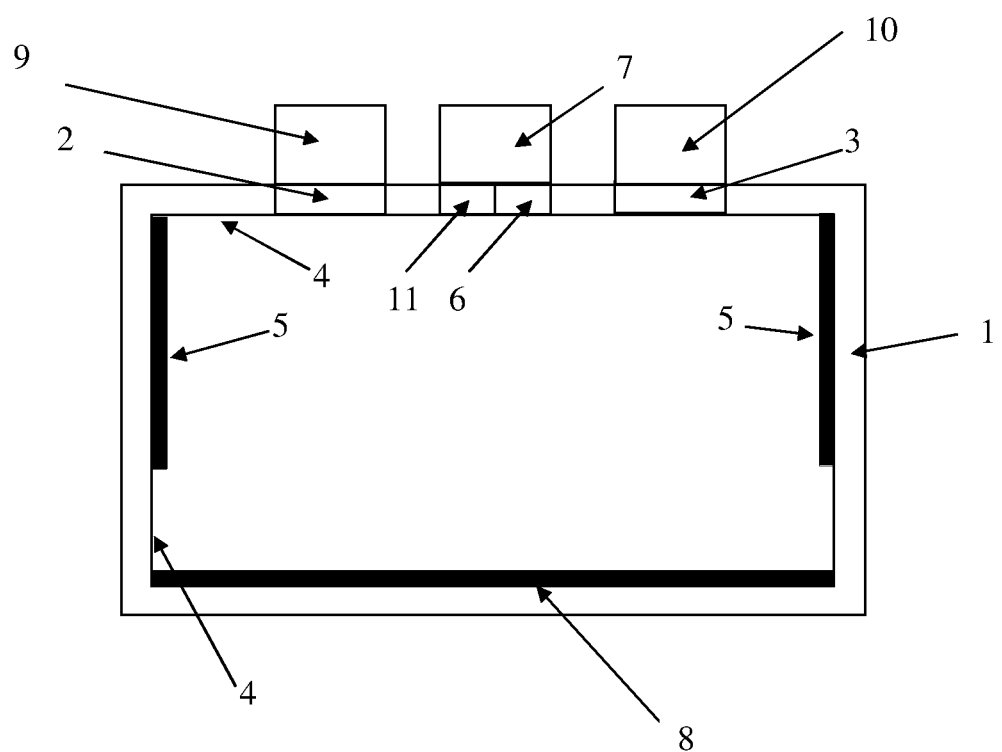

REACTOR FOR WASTE TREATMENT

BACKGROUND OF THE INVENTION

Field of the Invention

The invention relates to devices for disposal of solid and/or liquid waste, in particular, to devices for disposing waste by ionic-electronic destruction method.

Prior Art

There is a known reactor of patent RU 2786209 (published on Dec. 19, 2022) implemented as a closed cavity having an input opening connected to a waste feed device, and an output opening for removing gaseous destruction products, wherein inner surfaces of the cavity are entirely or partially conductive. An electrode protrudes into the reactor, the electrode being isolated from the inner surfaces and connected to a source of high-voltage pulses. Size of a gap between the electrode and the conductive surfaces of the cavity provides formation of corona discharge streamers.

Drawbacks of this reactor are formation of the corona discharge streamers around the electrode, necessity of using the source of high-voltage pulses, and difficulty of treating waste located away from the electrode, where the corona discharge streamers absent.

SUMMARY OF THE INVENTION

The invention is directed to broadening a range of reactors for treatment of waste having an enlarged area of formation of corona discharge streamers, and avoiding necessity of use of a source of high-voltage pulses.

The technical effect is attained by a reactor implemented as a closed cavity with an input opening connected to a waste feed unit, and with an output opening for removing gaseous destruction products, where an additional input opening is provided in the closed cavity, that is intended for supplying electrically charged substance particles into the reactor.

In one embodiment, the additional input opening is connected to a source of charged substance particles.

In one embodiment, inner surfaces of the reactor cavity are made conductive entirely or partially.

In one embodiment, bottom of the reactor cavity is covered with water or a conductive water-containing liquid.

Preferably, conductive portions of the inner surfaces of the reactor cavity are made of steel or another metal.

In one embodiment, non-conductive inner surfaces of the reactor cavity have a protective dielectric coating.

In one embodiment, the bottom of the reactor cavity is flat and conductive.

In one embodiment, the bottom of the reactor cavity includes baths for collecting condensed destruction products.

Preferably, pressure inside the reactor is reduced by 0.1 to 1.0 Pa relative to atmospheric pressure.

In one embodiment, reduced pressure inside the reactor is provided by connecting an electrostatic filter with a suction air fan to the output opening.

Preferably, ingress of air into the reactor is restricted.

In one embodiment, restriction of ingress of air is provided by means of a tamping plug that closes input of the reactor, where the tamping plug is pre-formed by compressing waste prior to loading thereof into the reactor.

In one embodiment, an additional output opening is provided in the closed cavity of the reactor, which is intended for supplying particles discharged during destruction initiation processes from the reactor to the source of electrically charged substance particles for their charging again.

Additional features and advantages of the claimed solution are described in the following disclosure, as well as proved by the actual practice of the invention. These advantages and improvements can be achieved by neural networks that have been constructed and trained in accordance with the claimed method, specifically, following the disclosure, along with the accompanying claims and drawings.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGURE shows a vertical cross-section of a reactor.

DETAILED DESCRIPTION OF EMBODIMENTS OF THE INVENTION

Reference will now be made in detail to the preferred embodiments of the present invention, examples of which are illustrated in the accompanying drawings.

The invention is illustrated in the FIGURE, which shows a vertical cross-section of a reactor, wherein the following designators are used:

1 body of reactor with inner cavity
2 input opening
3 output opening
4 inner surface of reactor cavity
5 conductive surfaces of inner surface of reactor cavity
6 additional input opening
7 source of charged substance particles
8 conductive bottom of reactor
9 unit for feeding waste to be treated
10 electrostatic filter with suction air fan
11 additional output opening As shown in the FIGURE, the invention may be implemented as a reactor with the body (1) having the input opening (2) connected to the unit (9) for feeding solid and/or liquid waste to be treated, and the output opening (3) for removing gaseous destruction products connected to the electrostatic filter (10) equipped with the suction air fan. The feed unit (9) is configured to restrict ingress of air into the reactor. Portions (5) of the inner surface (4) of the reactor body (1) and the bottom (8) are made of steel. The source (7) of charged substance particles is connected to the additional input opening (6) in the cavity of the reactor body (1).

The reactor operates as follows. A portion of waste, e.g., compressed solid household waste is loaded into the reactor from the unit (9) for feeding waste to be treated via the input opening (2), while ingress of atmospheric air into the reactor body (1) is restricted. Further, charged substance particles are supplied from the source (7) of charged substance particles into the cavity of the reactor body (1) via the additional input opening (6).

As it is known from [1], charged particles (e.g., dust) cause corona discharge streamers, which start multiplying and spreading away from the particles, gradually filling the whole volume of the cavity of the reactor body (1). Electrons of the corona discharge streamers exert an effect on water contained in the loaded waste and cause formation of free radicals upon destruction of water molecules: $H_2O \rightarrow OH\cdot + H\cdot$. In addition, other active substances are formed in the reactor due to corona discharge streamers: $O_3$, $O_2(a^1\Delta)$, $H_2O_2$, $O(^3P)$, NO, $HNO_2$ and $HNO_3$. Corona discharge also causes ultraviolet (UV) radiation. The above-mentioned active substances and UV radiation destroy any organic and inorganic substances contained in waste to be treated, thus providing destruction thereof and formation of harmless gaseous reaction products, namely, water and carbon dioxide. Non-organic contents of waste is destroyed by acids $HNO_2$ and $HNO_3$, which are formed in the reactor due to corona discharge. The process of oxidation of organic substances in water is a chain reaction [2]. Low-rate chain reaction may be initiated by atmospheric oxygen and ozone. High-rate chain reaction is initiated by $OH\cdot$ radicals. In other words, ionic-electronic destruction of both organic and inorganic substances contained in waste is provided in the reactor. Gaseous destruction products enter the output opening (3) of the reactor.

Thus, the specified technical effect is attained in the reactor, i.e., ionic-electronic destruction of both organic and inorganic substances contained in household waste is provided.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

NON-PATENT LITERATURE (INCORPORATED HEREIN BY REFERENCE IN THEIR ENTIRETY)

[1] Sinkevich A. A., Dovgalyuk Yu. A., Corona discharge in clouds, News of Higher Schools, Radiophysics, 2013, Vol. 56, Issue 11-12, pages 908-919.
[2] Piskarev I. M., Oxidation-reduction processes in water initiated by electrical discharge above water surface, General Chemistry Journal, 2001, Vol. 71, Issue 10, page 1622.

What is claimed is:

1. A reactor for treating waste, comprising:
a closed cavity with an input opening in an upper surface of the closed cavity connected to a waste feed unit, the input opening providing waste into the closed cavity;
the closed cavity having an additional input opening in the upper surface that supplies electrically charged particles into the reactor,
wherein a bottom surface of inner surfaces of the closed cavity is entirely conductive, and upper portion that is a distance from the top to more than half of vertical walls of the inner surfaces is conductive, while lower portion that is a distance from the bottom to less than half of the vertical walls of the inner surface is non-conductive, and
wherein a bottom surface of inner surfaces of the closed cavity is entirely conductive, and upper portions that are a distance from the top to more than half of vertical walls of the inner surfaces are conductive, while lower portions that are a distance from the bottom to less than half of the vertical walls of the inner surface are non-conductive, and
wherein interaction of the electrically charged particles with each other generates corona discharge streamers in the closed cavity, thereby forming free $OH\cdot$ and $H\cdot$ radicals and active substances that create destruction products of the waste by reacting with the waste; and
the closed cavity having an output opening, wherein gaseous destruction products of the reaction are removed from the closed cavity.

2. The reactor of claim 1, further comprising a source of charged substance particles connected to the additional input opening.

3. The reactor of claim 1, wherein the conductive portions of the inner surfaces of the closed cavity are made of steel or another metal.

4. The reactor of claim 1, wherein the non-conductive inner surfaces of the closed cavity have a protective dielectric coating.

5. The reactor of claim 1, wherein a bottom of the closed cavity is covered with water or a conductive water-containing liquid.

6. The reactor of claim 1, wherein the bottom surface of the closed cavity is flat.

7. The reactor of claim 1, wherein the bottom surface of the closed cavity includes baths for collecting condensed destruction products.

8. The reactor of claim 1, wherein pressure inside the reactor is 0.1 to 1.0 Pa less than atmospheric pressure.

9. The reactor of claim 8, wherein the pressure inside the reactor is reduced by connecting an electrostatic filter with a suction air fan to the output opening.

10. The reactor of claim 1, wherein ingress of air into the reactor is restricted by a tamping plug that closes input of the reactor, the tamping plug being pre-formed by compressing the waste prior to loading thereof into the reactor.

11. The reactor of claim 1, wherein the active substances are any of $O_3$, $O_2(a^1\Delta)$, $H_2O_2$, $O(^3P)$, NO, $HNO_2$ and $HNO_3$.

12. The reactor of claim 1, wherein the closed cavity has an additional output opening that supplies particles discharged in the closed cavity to a source of electrically charged particles for their re-charging.

13. A reactor for treating waste, comprising:
a closed cavity with a first input opening connected to a waste feed unit, the first input opening providing waste into the closed cavity;
the closed cavity having a second input opening in an upper surface of the closed cavity that supplies electrically charged solid particles into the reactor,
wherein a bottom surface of inner surfaces of the closed cavity is entirely metallic, and upper portion that is a distance from the top to more than half of vertical walls of the inner surfaces is metallic, while lower portion that is a distance from the bottom to less than half of the vertical walls of the inner surface is non-metallic, and
wherein interaction of the electrically charged particles with each other generates corona discharge streamers in the closed cavity; and
the closed cavity having an output opening, wherein gaseous destruction products of the waste are removed from the closed cavity.

* * * * *